(12) United States Patent
Eleftheriou et al.

(10) Patent No.: US 10,423,878 B2
(45) Date of Patent: Sep. 24, 2019

(54) ARTIFICIAL NEURON APPARATUS

(71) Applicant: International Business Machines Corporation, Armonk, NY (US)

(72) Inventors: Evangelos S. Eleftheriou, Rueschlikon (CH); Lukas Kull, Zurich (CH); Manuel Le Gallo-Bourdeau, Zurich (CH); Angeliki Pantazi, Thalwil (CH); Abu Sebastian, Adliswil (CH); Tomas Tuma, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 15/258,328

(22) Filed: Sep. 7, 2016

(65) Prior Publication Data
US 2018/0068217 A1    Mar. 8, 2018

(51) Int. Cl.
| | | |
|---|---|---|
| *G06N 3/063* | (2006.01) | |
| *G06N 3/04* | (2006.01) | |
| *G06N 3/02* | (2006.01) | |
| *G06N 3/08* | (2006.01) | |
| *G06F 17/27* | (2006.01) | |

(52) U.S. Cl.
CPC ............ *G06N 3/0635* (2013.01); *G06N 3/049* (2013.01)

(58) Field of Classification Search
CPC ........ G06N 3/0635; G06N 3/049; G06N 3/04; G06N 3/063; G06N 3/08
USPC ...................................................... 706/1–62
See application file for complete search history.

(56) References Cited

U.S. PATENT DOCUMENTS

| | | | |
|---|---|---|---|
| 8,589,320 B2 | 11/2013 | Breitwisch et al. | |
| 8,892,487 B2 | 11/2014 | Chang et al. | |
| 9,269,044 B2 | 2/2016 | Akopyan et al. | |
| 2010/0246152 A1* | 9/2010 | Lin .................. | H01L 21/563 361/783 |
| 2010/0299297 A1* | 11/2010 | Breitwisch ......... | G06N 3/049 706/33 |

(Continued)

OTHER PUBLICATIONS

Nabil Imam, et al., "A Digital Neurosynaptic Core Using Event-Driven QDI Circuits," 2012 18th IEEE International Symposium on Asynchronous Circuits and Systems (ASYNC), IEEE Computer Society, pp. 25-32.

*Primary Examiner* — Brandon S Cole
(74) *Attorney, Agent, or Firm* — Daniel P. Morris, Esq.; Hoffmann & Baron, LLP

(57) ABSTRACT

Artificial neuron apparatus includes first and second resistive memory cells. The first resistive memory cell is connected in first circuitry having a first input and output. The second resistive memory cell is connected in second circuitry having a second input and output. The first and second circuitry are operable in alternating read and write phases to apply a programming current to their respective memory cells on receipt of excitatory and inhibitory neuron input signals, respectively. During the write phase, resistance of the respective cells is changed in response to successive excitatory and inhibitory neuron input signals. During the read phase, a read current is applied to their respective cells to produce first and second measurement signals, respectively. An output circuit connected to the first and second outputs produces a neuron output signal at a neuron output when a difference between the first and second measurement signals traverses a threshold.

9 Claims, 6 Drawing Sheets

(56) References Cited

U.S. PATENT DOCUMENTS

| | | | | |
|---|---|---|---|---|
| 2012/0011092 A1* | 1/2012 | Tang | ................. | G06N 3/049 |
| | | | | 706/33 |
| 2012/0084241 A1* | 4/2012 | Friedman | ............... | G06N 3/049 |
| | | | | 706/27 |
| 2012/0150781 A1* | 6/2012 | Arthur | .................. | G06N 3/049 |
| | | | | 706/35 |
| 2013/0073497 A1* | 3/2013 | Akopyan | ............... | G06N 3/049 |
| | | | | 706/27 |
| 2014/0114893 A1* | 4/2014 | Arthur | .................. | G11C 11/54 |
| | | | | 706/25 |
| 2014/0122402 A1* | 5/2014 | Bichler | ................ | G06N 3/0635 |
| | | | | 706/27 |
| 2015/0278681 A1 | 10/2015 | Saxena | | |
| 2016/0004960 A1* | 1/2016 | Sa Ghi | .................... | G06N 3/08 |
| | | | | 706/25 |
| 2016/0085742 A1* | 3/2016 | Mahmud | ............ | G06F 17/2775 |
| | | | | 704/9 |

* cited by examiner

ARTIFICIAL NEURON APPARATUS

BACKGROUND

The present invention relates generally to artificial neuron apparatus, and more particularly to artificial neurons based on resistive memory cells.

Neuromorphic technology relates to computing systems which are inspired by biological architectures of the nervous system. Conventional computing systems are based on binary logic and sequential von Neumann architecture. While efficient in performing tasks such as numerical calculations, separation between external memory and processors in these systems leads to energy-hungry data movements. Compared to the human brain, the conventional computing paradigm is highly inefficient in terms of power consumption and space requirements. These issues have prompted a significant research effort to understand the highly efficient computational paradigm of the human brain and to create artificial cognitive systems with unprecedented computing power. For example, there is a strategic intent to develop "neuromorphic co-processors" able to carry out event-based computations in compute-intensive tasks such as "big data" analytics and real-world sensory applications.

Neurons, along with synapses, are basic computational units in the brain. In biological neurons, a thin lipid-bilayer membrane is used to separate the electrical charge inside of the cell from that outside of it. A vital function of the neuron is the update of the membrane potential which represents the stored neuron state. The membrane potential is modified by the arrival of neuron input signals. When the membrane potential traverses a specific voltage threshold, the neuron will "fire," generating an output signal known as an "action potential" or "spike," and then revert to its initial state. These spikes are conveyed to other neurons via synapses which change their connection strength ("plasticity" or "synaptic weight") as a result of neuronal activity.

The realization of efficient artificial neurons is of fundamental importance to neuromorphic technology. Most prior proposals for artificial neurons are based on hybrid analog/digital VLSI circuits, requiring complex CMOS circuitry with a large number of transistors to emulate neuronal functionality. Resistive memory cells such as phase-change memory (PCM) cells have also been recognized as suitable candidates for the realization of neural hardware (see, e.g., "The Ovonic Cognitive Computer—A New Paradigm," Ovshinsky, Proc. E/PCOS, 2004, and "Novel Applications Possibilities for Phase-Change Materials and Devices," Wright et al., Proc. E/PCOS, 2013). Resistive memory cells are programmable-resistance devices which rely on the variable resistance characteristics of a volume of resistive material disposed between a pair of electrodes. These cells are memristors, i.e., devices that remember the history of the current that has flowed through them. A neuron circuit based on Mott memristors has also been proposed in "A Scalable Neuristor built with Mott Memristors," Pickett et al. Nature Materials, 2013.

Prior artificial neurons based on memristive devices have been concerned only with emulating the integrate-and-fire functionality or emulating the biological action potential shape. Concrete realizations for efficient artificial neurons for operation in a neural network configuration remain a challenge. Moreover, in real neuronal networks the updates to neuron membrane potentials can be of an excitatory nature (increase of the membrane potential) or an inhibitory nature (decrease of the membrane potential). Artificial neurons able to meet such requirements would be highly desirable.

SUMMARY

According to at least one embodiment of the present invention there is provided artificial neuron apparatus comprising first and second resistive memory cells. The first resistive memory cell is connected in first circuitry having a first neuron input, for receiving excitatory neuron input signals, and a first output. The second resistive memory cell is connected in second circuitry having a second neuron input, for receiving inhibitory neuron input signals, and a second output. The first and second circuitry are operable in alternating read and write phases to apply a programming current, for programming cell resistance, to their respective memory cells on receipt of an excitatory and an inhibitory neuron input signal respectively during said write phase, whereby resistance of the respective cells is progressively changed in response to successive excitatory and inhibitory neuron input signals respectively, and, during said read phase, to apply a read current to their respective cells to produce first and second measurement signals respectively, dependent on resistance of the respective cells, at the first and second outputs respectively. The apparatus includes an output circuit connected to the first and second outputs and operable to produce a neuron output signal at a neuron output if a difference between the first and second measurement signals traverses a threshold.

Embodiments of the invention offer efficient neuron realizations which can accommodate both excitatory and inhibitory neuron input signals. The neuron membrane potential is effectively represented by the difference between the first and second measurement signals. These signals depend in turn on resistance of the first and second memory cells, one of which changes with excitatory inputs and the other with inhibitory inputs. Hence, the membrane potential can both increase and decrease, and the neuron fires, generating a neuron output signal, if the difference between the measurement signals traverses the threshold.

The difference condition for firing can be selected as required to achieve firing in desired circumstances. By appropriate choice of memory cells and circuit design, the apparatus may be adapted such that resistance of the first and second memory cells is progressively reduced in response to successive excitatory and inhibitory neuron input signals respectively. The apparatus may then be adapted such that the aforementioned difference between the first and second measurement signals traverses the threshold if resistance of the first memory cell drops more than a predetermined amount below resistance of the second memory cell. This allows the neuron apparatus to fire if it receives sufficiently more excitatory than inhibitory signals, causing resistance of the first cell to drop sufficiently relative to that of the second. In a particularly simple arrangement here, the first and second circuitry is adapted such that the first and second measurement signals vary directly with resistance of the first and second memory cells respectively, and the output circuit is adapted to produce a neuron output signal if the difference $M_2 - M_1$ exceeds the threshold, where $M_1$ is the first measurement signal and $M_2$ is the second measurement signal.

In an efficient hybrid analog/digital implementation, the output circuit preferably comprises a threshold difference circuit connected to the first and second outputs and operable to output a difference signal dependent on said difference, wherein the difference signal corresponds to a first digital value if the difference traverses the threshold, and a second digital value otherwise. The output circuit preferably also includes: a digital latch operable in the read phase to latch a digital value dependent on said difference signal; and a logic gate connected between the latch and the neuron output and operable in the write phase, in response to the latched digital value, to provide said neuron output signal at the neuron output if said difference traverses the threshold. With this arrangement, the neuron spike is conveniently synced to the write phase. This facilitates interconnection of neurons in a synchronous arrangement, as well as other preferred features described below.

In preferred embodiments, each of the first and second circuitry is selectively configurable for operation in the read and write phases in response to a set of (one or more) control signals defining the read and write phases. This offers highly efficient implementations. Control signal(s) can be a simple periodic signal(s) which can be easily generated, for example from a system clock, and can be readily applied to multiple neuron circuits for efficient, global control of a multi-neuron network.

The first and second circuitry are preferably further configurable in response to said neuron output signal to apply a reset current to their respective memory cells for resetting the cells to an initial resistance state. The neuron output signal, or spike, is thus conveniently used to effect reset of the cells during the write phase, so that the neuron reverts automatically to its initial state ready for a new cycle of operation. The first and second circuitry may be further configurable in response to a neuron reset signal, which can be externally-generated and received during the write phase, to apply a reset current to their respective memory cells to reset the cells to the initial resistance state. This allows convenient reset of the neuron in the event that changes in cell resistance do not produce a spike.

Embodiments of the invention will be described in more detail below, by way of illustrative and non-limiting example, with reference to the accompanying drawings.

DETAILED DESCRIPTION

The illustrative embodiments described herein below provide artificial neuron apparatus based on resistive memory cells. In the examples below, the resistive memory cells are PCM cells. The variable-resistance properties of PCM cells arise from heating a volume of chalcogenide material between the cell electrodes so as to change the relative proportions of a (high-resistance) amorphous phase and a (low-resistance) crystalline phase in the chalcogenide volume. If a voltage less than a certain threshold switching voltage is applied to the cell via the electrodes, the current will be so small that there will be very little Joule heating and substantially no phase change in the cell volume. However, if a programming (or "write") signal above the threshold voltage is applied, cell resistance drops to a very low value during application of the pulse through the phenomenon of electronic threshold switching. This enables the flow of a large current which results in significant Joule heating and subsequent phase change. For a cell initially in the high-resistance state, application of a programming pulse with a certain input power and duration, based on cell characteristics and circuit design, causes partial crystallization of the amorphous region, with a consequent reduction in cell resistance after programming. The cells exhibit an accumulation property whereby, through application of many such programming pulses, resistance of the memory cell can be progressively reduced down to a very low value compared to the initial high-resistance state. The cell-resistance can be measured (or "read") at any time by applying a low-voltage signal to the electrodes and measuring the resulting current flow through the cell. The signal level for the read operation is low enough that the read operation does not disturb the programmed cell-state.

Figure 1:
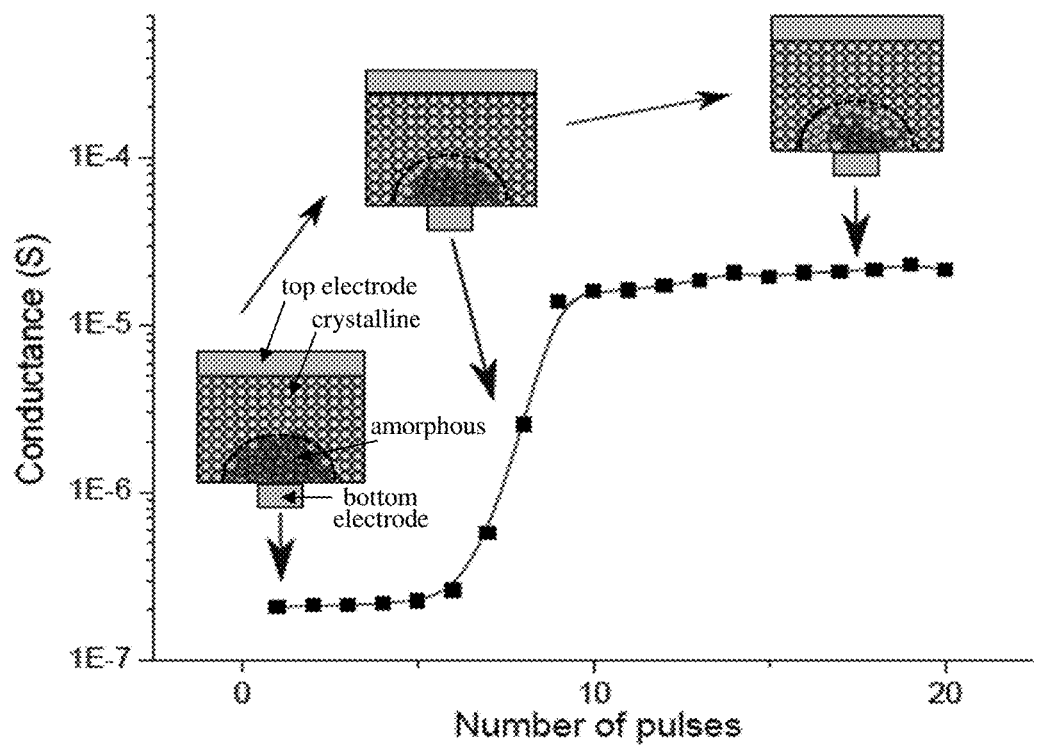
FIG. 1 is a schematic illustration of progressive crystallization in a phase-change memory cell.

The above process is illustrated schematically in Figure (FIG. 1. This figure shows the evolution of cell state, in terms of electrical conductance (inverse of resistance) of the PCM cell, as a function of the number of programming pulses. The cell shown here is of the "mushroom cell" type, having a chalcogenide material such as GST (Germanium-Antimony-Tellurium) disposed between a first, "top" electrode and a second, "bottom" electrode. The smaller, bottom electrode serves as a heater for heating a dome of amorphous chalcogenide within the otherwise crystalline material. The initial state of the cell is a high-resistance (low-conductance) state due to presence of the high-resistance amorphous dome between the electrodes. Successive programming pulses cause partial crystallization of the amorphous volume, whereby cell-resistance is progressively reduced. After a certain number of pulses, the cell is transformed into a low-resistance (high-conductance) state. The cell can be reset to its initial high-resistance state by application of a pulse of sufficient power to melt the chalcogenide material adjacent the bottom electrode. The high-resistance amorphous dome is then restored on cooling.

Figure 2:
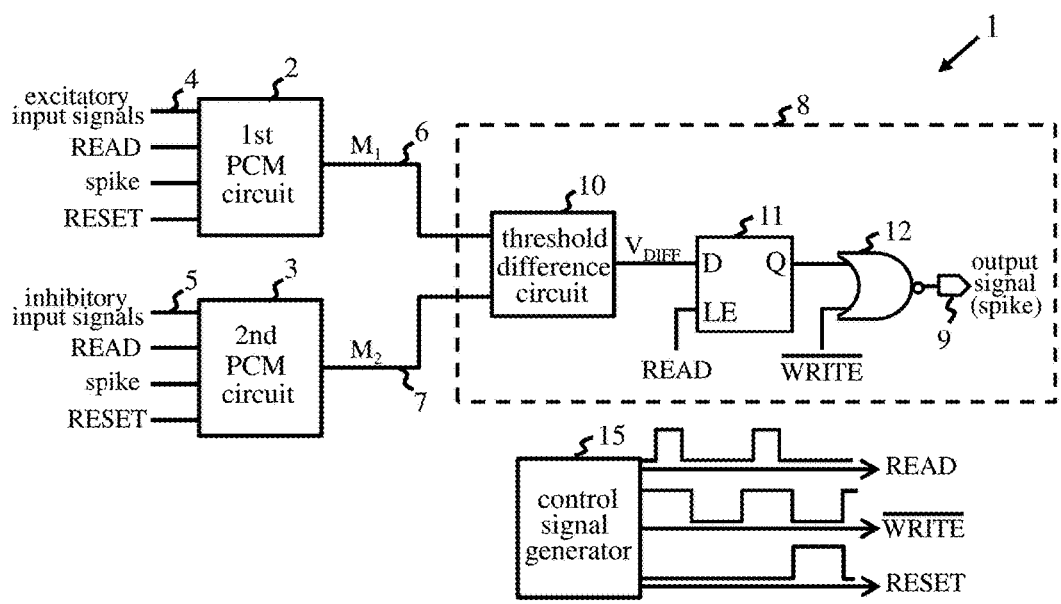
FIG. 2 is a schematic block diagram of an exemplary artificial neuron apparatus, according to an embodiment of the invention.

FIG. 2 shows a high-level block diagram of an exemplary artificial neuron apparatus 1, according to an embodiment of the invention. The neuron apparatus 1 includes first and second PCM cells (not explicitly shown in this figure). The first PCM cell is connected in first circuitry represented by first PCM circuit 2 in the figure. The second PCM cell is connected in second circuitry represented by second PCM circuit 3. The first PCM circuit 2 has a first neuron input 4 which receives excitatory neuron input signals in operation. The second PCM circuit 3 has a second neuron input 5 which receives inhibitory neuron input signals in operation. The excitatory and inhibitory neuron input signals may be generated by one or more other circuits in a neuromorphic system in which neuron 1 is connected. For example, output signals from other neurons may be supplied, e.g. via synapse circuits, as input signals to neuron 1. For a given neuron 1 in a neuromorphic network, signals received from designated excitatory neurons/synapses may provide the excitatory input signals, while those received from other, inhibitory neurons/synapses may provide the inhibitory input signals. Signals representing external neuron stimuli, e.g. from circuits emulating sensory receptors, may also be supplied as excitatory/inhibitory input signals. However, the particular way in which excitatory/inhibitory signals are generated in a neuromorphic system is orthogonal to the operation described below.

The first PCM circuit 2 has a first output 6 and the second PCM circuit 3 has a second output 7. These outputs 6, 7 are connected to an output circuit 8 of the apparatus. The output circuit 8 produces a neuron output signal, or spike, at a neuron output 9 in circumstances described below. In the example shown, output circuit 8 comprises a threshold difference circuit 10 connected to the outputs 6, 7 of the PCM circuits, a digital latch 11 connected to an output of the threshold difference circuit 10, and a logic gate, here a NOR gate 12, connected between the latch 11 and neuron output 9.

The first and second PCM circuits 2, 3, as well as output circuit 8 of this embodiment, are operable in alternating read and write phases. The read and write phases of neuron operation are defined by a set of control signals supplied to neuron 1. These control signals are produced by a control signal generator, indicated at 15, which can be provided externally of neuron 1 and may provide control signals to multiple neurons in a neuromorphic network. In general, the set of control signals may comprise one or more control signals, and operation of PCM circuits 2, 3 may be responsive to one or more of these signals. In this illustrative embodiment, the control signals include a read control signal (READ) and a write control signal ($\overline{\text{WRITE}}$). The READ signal comprises a periodic train of rectangular pulses as indicated schematically in the figure. The read phase of neuron operation occurs when the read signal is high. The write phase of neuron operation occurs during the period when the read signal is low. In particular, the $\overline{\text{WRITE}}$ signal comprises a periodic, rectangular-pulse train, and the write phase of neuron operation corresponds to the period for which this signal is low. This occurs during the period when READ is low, whereby the READ and $\overline{\text{WRITE}}$ signals define alternating read and write phases in operation. In this embodiment, the control signal generator also generates a neuron reset signal RESET which is discussed further below.

As indicated in FIG. 1, each PCM circuit 2, 3 receives the read control signal READ, the neuron output signal (spike) when generated, and the neuron reset signal RESET explained below. Configuration of the first and second PCM circuits 2, 3 is such that these circuits apply a programming current, for programming cell resistance, to their respective memory cells on receipt of an excitatory and an inhibitory neuron input signal respectively during the write phase, whereby resistance of the respective cells is progressively changed in response to successive excitatory and inhibitory neuron input signals respectively. With the PCM cells of this embodiment, successive input signals cause cell resistance to be progressively reduced from a first, high-resistance state to a second, low-resistance state as described with reference to FIG. 1. During the read phase, the first and second PCM circuits 2, 3 apply a read current to their respective cells to produce first and second measurement signals (denoted by $M_1$ and $M_2$) respectively. The measurement signals $M_1$ and $M_2$ are dependent on resistance of the respective PCM cells, and are provided at the first and second outputs 6, 7 respectively. The measurement signals $M_1$, $M_2$ are thus supplied to output circuit 8.

The output circuit 8 operates to produce a neuron output signal at the neuron output 9 if a difference between the first and second measurement signals traverses a threshold TH. In particular, the threshold difference circuit 10 receives the measurement signals $M_1$, $M_2$ and outputs a difference signal $V_{DIFF}$ which is dependent on the difference between the measurement signals. The difference signal $V_{DIFF}$ corresponds to a first digital value if the difference between $M_1$ and $M_2$ traverses the threshold TH, and a second digital value otherwise. The latch 11 operates in the read phase to latch a digital value dependent on the difference signal $V_{DIFF}$. In this illustrative embodiment, the difference signal $V_{DIFF}$ is supplied directly to a data input D of latch 11. The read control signal READ is supplied to an enable input LE of the latch. The latch thus operates in the read phase, when READ is high, to latch either the first or second digital value in accordance with the current difference signal $V_{DIFF}$ at its data input D. The resulting latched value is provided at a latch output Q. When the latch enable input LE goes low, i.e. READ=low, the latch output Q remains as it was when LE was last high. The latch output Q is connected to one input of NOR gate 12. The other input of NOR gate 12 receives the write control signal $\overline{\text{WRITE}}$. The NOR gate operates in the write phase, in response to latch output Q, to provide a spike at neuron output 9 if the latched value corresponds to the first digital value, i.e. when the difference between $M_1$ and $M_2$ traverses the threshold TH. This operation will be explained in more detail below.

Figure 3:
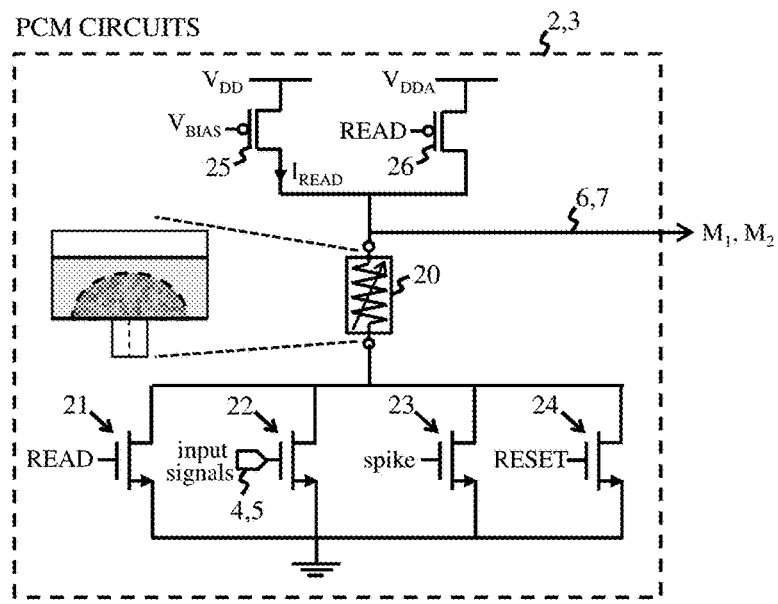
FIG. 3 is a more detailed illustration of PCM circuitry in the exemplary artificial neuron apparatus shown in FIG. 2, according to an embodiment of the invention.

FIG. 3 shows an exemplary configuration of each of the PCM circuits 2, 3 in this embodiment. Each circuit 2, 3 includes a PCM cell which is represented by variable resistance 20 and may be of the mushroom-cell type as indicated in the enlargement. The circuitry further includes a set of access devices for enabling current flow through PCM cell 20 in operation. This embodiment employs four access devices, implemented here by FETs (field-effect transistors) 21 to 24, which are connected between a first (here the lower) terminal of cell 20 and a reference terminal of the circuit, here a signal earth. The gate of first FET 21 receives the read signal READ and enables current flow through cell 20 in response to the read phase. The gate of second FET 22 is connected to the neuron input 4, 5 of the respective PCM circuit 2, 3 and receives the excitatory or inhibitory neuron input signals respectively. This FET 22 enables current flow through cell 20 in response to the excitatory or inhibitory neuron input signals as supplied to the PCM circuit 2 or 3. The gate of third FET 23 receives the neuron output signal (spike) produced at neuron output 9 in operation. This FET 23 thus enables current flow through cell 20 in response to the neuron output signal. The gate of fourth FET 24 receives the neuron reset signal RESET discussed further below. This FET 24 thus enables current flow through cell 20 in response to the RESET signal.

The circuitry includes a current source 25 for supplying a constant read current $I_{READ}$ to PCM cell 20 in operation. The current source 25 is implemented here by a PMOS (P-type metal-oxide-semiconductor) transistor whose gate is held at a bias voltage $V_{BIAS}$. The read current $I_{READ}$ is supplied to cell 20 during the read phase in response to enabling of access device 21 by read control signal READ. The current source 25 is connected between a second (here the upper) terminal of cell 20 and a first voltage supply line $V_{DD}$. The circuitry also includes a switch 26 which is connected between the upper cell terminal and a second voltage supply line $V_{DDA}$. The switch 26 is implemented by a PMOS transistor which receives the read control signal READ at its gate. Due to PMOS operation, transistor 26 is switched on when its gate is low. Hence, switch 26 closes when the control signal READ is low, connecting cell 20 to supply line $V_{DDA}$ during this period and thus during the write phase when $\overline{\text{WRITE}}$ is low. In this way, switch 26 operates to apply a programming current to cell 20 during the write phase of operation if access device 22 is enabled by a neuron input signal. (The voltage $V_{DDA}$ is typically higher than voltage $V_{DD}$ to provide a high programming current sufficient for programming of cell 20). The PCM circuits 2, 3 are thus selectively configurable for operation in the alternating read and write phases.

The output 6, 7 of PCM circuit 2, 3 is connected to the upper terminal of the respective PCM cell 20. During the read phase when READ is high, FET 21 is switched on and switch 26 is open. In this configuration, the read current $I_{READ}$ from current source 25 is applied to PCM cell 20. This read current is too small to change the PCM cell state as explained earlier. The resulting voltage at the output 6, 7 thus depends on resistance of the respective PCM cell 20, varying directly with cell resistance in this embodiment. This voltage at output 6, 7 of each PCM circuit 2, 3 provides the respective measurement signal $M_1$, $M_2$. During the write phase when $\overline{\text{WRITE}}$ is low, switch 26 is closed because READ is low. If a neuron input signal is received at input 4, 5 during this phase, FET 22 will switch on and a programming current, for programming cell resistance, will be applied to PCM cell 2. (A sufficiently large current for cell-programming can be achieved here by appropriate selection of (one or a combination of) the supply voltage $V_{DDA}$, the characteristics of access device 22, and the neuron input signal characteristics as will be apparent to those skilled in the art). In this way, cell resistance can be progressively reduced from an initial high-resistance state to a low-resistance state in response to successive neuron input signals received during write phases of neuron operation. The measurement signal $M_1$ or $M_2$ obtained at output 4 or 5 during the read phase will thus progressively decrease from a high voltage-level to a low voltage-level as resistance of the corresponding cell decreases. In particular, the first measurement signal $M_1$ from first PCM circuit 2 will progressively decrease in response to receipt of excitatory neuron input signals at neuron input 4. The second measurement signal $M_2$ from second PCM circuit 3 will progressively decrease in response to receipt of inhibitory neuron input signals at neuron input 5.

The measurement signals $M_1$ and $M_2$ are received by threshold difference circuit 10 during the read phase. In this embodiment, threshold difference circuit 10 outputs a difference signal $V_{DIFF}$ corresponding to the first digital value, here logic 0, if resistance of the first PCM cell in PCM circuit 2 drops more than a predetermined amount below resistance of the second memory cell in PCM circuit 3. In particular, the difference signal output by threshold difference circuit 10 changes from the second digital value (here logic 1) to the first digital value (logic 0) if the difference $M_2-M_1$ between the received measurement signals exceeds the threshold TH. Prior to this point (i.e. when $V_{DIFF}$ corresponds to logic 1), the value latched by latch 11 during the read phase (READ=high at latch input LE) will be logic 1. The latch output Q remains at logic 1 for the next write phase when $\overline{\text{WRITE}}$ goes low. Hence, the output of NOR gate 12 is at logic 0 and no output signal is obtained at neuron output 9. Subsequently, in the first read phase when the difference $M_2-M_1$ exceeds the threshold TH, the signal $V_{DIFF}$ changes to logic 0. This value is then latched by latch 11 during that read phase, and the latch output Q switches to logic 0. The latch output Q remains at logic 0 for the next write phase when $\overline{\text{WRITE}}$ goes low. Hence, the output of NOR gate 12 switches to logic 1 during this write phase, providing a spike at neuron output 9. Neuron spikes are thus conveniently synced to the write phase. Where neuron input signals result from spikes from other, similar neurons in a network configuration, neuron input signals can be conveniently synced to the write phase in this way.

It will be seen from the above that neuron 1 produces a spike during the write phase if it receives sufficiently more excitatory than inhibitory inputs, causing resistance of the first PCM cell to drop sufficiently relative to resistance of the second PCM cell that the difference $M_2-M_1$ exceeds the threshold TH in the immediately preceding read phase. In this embodiment, the PCM circuits 2, 3 are configurable in response to this spike to apply a reset current to their respective PCM cells 20 for resetting cell resistance to the initial, high-resistance state. In particular, a spike produced at neuron output 9 during a write phase is applied to the gate of FET 23 in PCM circuits 2, 3. As a result, this FET enables flow of a reset current through PCM cell 20 during this write phase. A sufficiently large reset current can be achieved here by appropriate selection of one or a combination of the characteristics of access device 23, the supply voltage $V_{DDA}$, and the neuron output signal characteristics (e.g. amplitude and/or duration) as will be apparent to those skilled in the art. The PCM cell 20 is thus reset to its initial, pre-accumulation state during the write phase in which neuron 1 fires.

As described earlier, spikes produced on firing of neuron 1 may be relayed to one or more other neurons in a network arrangement, providing input signals to these neurons. Spikes may be relayed via synapse circuits which may modify spike characteristics (e.g. amplitude and/or duration) according to synaptic weight. Synapse circuits may be implemented in various ways and synapse implementation is orthogonal to operation of the neurons described herein. It suffices to appreciate that the neuron input signals (excitatory and inhibitory) may vary in form, and their effect on programming of cell resistance may vary accordingly. The various circuit components of neuron 1 can be implemented in generally known manner, and the neuron apparatus can be fabricated as an integrated nanoelectronic circuit using well-known material processing techniques. The periodicity of control signals can be set as desired based on cell characteristics and desired operating speeds. By way of example only, a typical read/write period for the above circuit may be 200 to 500 ns.

Figure 4:
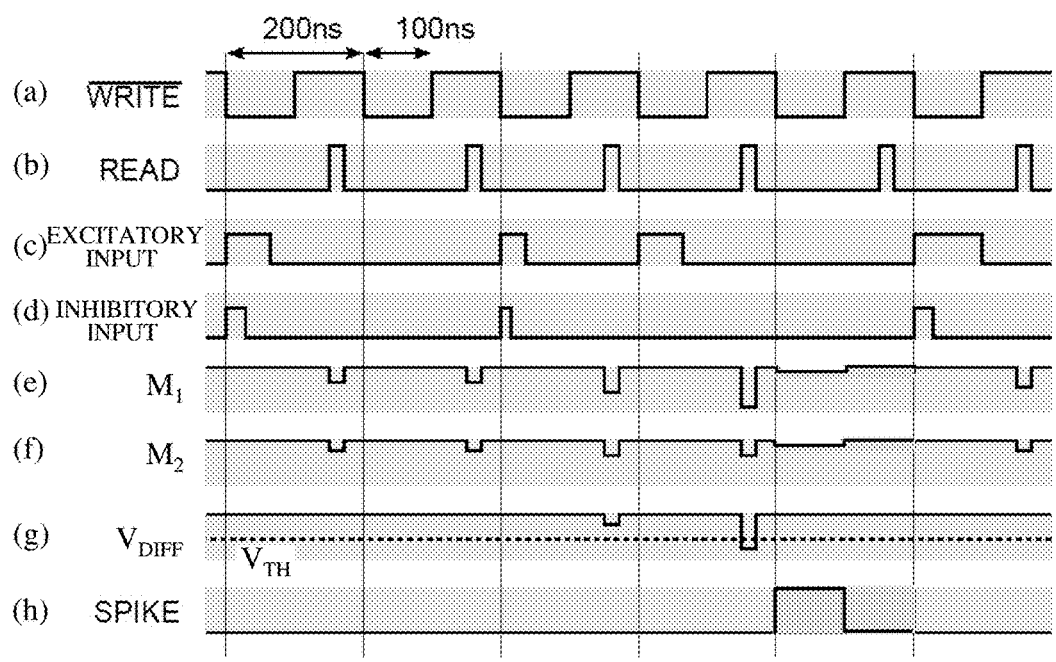
FIG. 4 is a schematic timing diagram indicating an exemplary operation of the neuron apparatus, according to an embodiment of the invention.

The neuron operation is conveniently illustrated in the signal timing diagram of FIG. 4. The top section (a) of this diagram shows an exemplary write signal $\overline{\text{WRITE}}$ as a pulse train of period 200 ns defining a 100 ns write phase. Section (b) shows an exemplary READ signal. Section (c) shows excitatory neuron input signals applied to first neuron input 4 during some of the write phases. Section (d) shows inhibitory neuron input signals applied to second neuron input 5 during some write phases. Sections (e) and (f) indicate the measurement signals $M_1$ and $M_2$ respectively during the phases approaching and traversing a firing event. Section (g) shows the corresponding difference signal $V_{DIFF}$ output by threshold difference circuit 10. In the first write phase ($\overline{\text{WRITE}}$=low), both excitatory and inhibitory neuron input signals are received by PCM circuits 2, 3, and the corresponding cell resistances are reduced accordingly via the programming operation. In the next read phase (READ=high), the difference $M_2$-$M_1$ is still below the firing threshold TH. $V_{DIFF}$ is thus above a voltage level $V_{TH}$ corresponding to the threshold TH, whereby $V_{DIFF}$ is at a high level corresponding to logic 1. A similar process occurs in the third write phase, after no input signals are received during the second write phase. In the fourth write phase, only an excitatory input signal is received and resistance of the first PCM cell in PCM circuit 2 is further reduced. In the next read phase, the difference $M_2$-$M_1$ has traversed the threshold TH. $V_{DIFF}$ then drops below $V_{TH}$, and thus corresponds to logic 0. Hence, a spike is produced at neuron output 9 during the fourth write phase as indicated in section (h). This spike effects reset of the cells as described above, whereby the cell resistance is restored to the initial, high-resistance state for the following read phase.

The neuron 1 of this embodiment only produces a spike if it receives sufficiently greater excitatory than inhibitory inputs, causing the difference $M_2$-$M_1$ to exceed TH. No spike will be generated in this embodiment if the inhibitory inputs exceed the excitatory inputs. Hence, depending on the neuron input signals, resistance of one or both cells may reach their low-resistance state without a spike being generated. The neuron reset signal RESET mentioned earlier is provided for this reason. In this embodiment, the RESET signal is conveniently provided by signal generator 15 as a periodic train of rectangular pulses synced to the write phase. The periodicity of this pulse train can be set as appropriate depending, for example, on cell and circuit characteristics and expected input signal frequencies, as will be apparent to those skilled in the art. By way of illustration only, with the 200 ns-period write signal of the above example, an appropriate reset signal period might be from 5 to 20 microseconds. The PCM circuits 2, 3 are configurable in response to the RESET signal to apply a reset current to their respective PCM cells 20. In particular, a reset pulse applied to gate of FET 24 in PCM circuits 2, 3 enables flow of a reset current through PCM cells 20 during the write phase, resetting cell resistance to the initial, high-resistance state. A sufficiently large reset current can be achieved here by appropriate selection of characteristics as discussed earlier.

Figure 5:
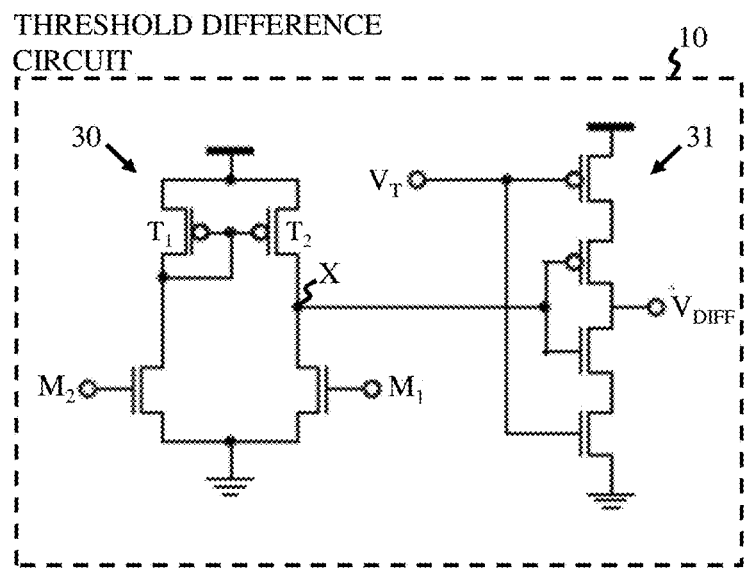
FIG. 5 shows an implementation of a threshold difference circuit of the exemplary neuron apparatus, according to an embodiment of the invention.
Figure 9:
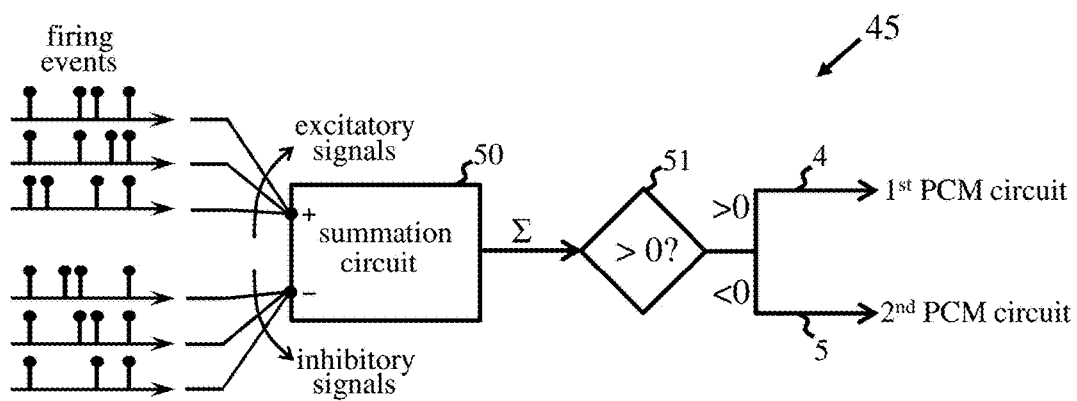
FIG. 9 is a schematic depicting exemplary circuitry for supplying input signals to the neuron apparatus, according to an embodiment of the invention.

An exemplary implementation for threshold difference circuit 10 is shown in FIG. 5. This circuit 10 comprises a current mirror 30 and a trigger-adjustable inverter 31. Current mirror 30 is connected to the outputs 6, 7 of PCM circuits 2, 3 and receives the measurement signals $M_1$ and $M_2$ as indicated. A voltage $V_X$ at junction X in the figure provides a difference output dependent on the difference $M_2$-$M_1$. This output is supplied to the trigger-adjustable inverter 31 whose trigger threshold is determined by a trigger voltage, denoted by $V_T$ in the figure. Current on each side of the current mirror varies considerably since the current/voltage curve of the component transistors is exponential. However, if the inputs are equal ($M_1$=$M_2$), the output $V_X$ is at mid-rail. In this state, the difference signal $V_{DIFF}$ at the inverter output is at a high level, corresponding to logic 1. This can be achieved by setting the trigger voltage $V_T$ below mid-rail or choosing the size of transistors accordingly. As $M_2$ decreases relative to $M_1$, current through transistor $T_1$ decreases and the current mirror tries to equalize the current through transistor $T_2$, resulting in a higher output resistance of transistor $T_2$ compared to the transistor connected to $M_1$. However, if $M_2$-$M_1$ becomes sufficiently large (i.e. greater than firing threshold TH), the voltage $V_X$ will be pulled up to $V_{DD}$. The trigger voltage $V_T$ is set such that, when $V_X$ gets close to equaling $V_{DD}$, inverter output $V_{DIFF}$ switches to a low level, corresponding to logic 0. This triggers spike generation as described above. The trigger voltage $V_T$ and circuit element characteristics in FIG. 9 can be selected as required to set a desired firing threshold TH and thus obtain a spike at a desired voltage difference $M_2$-$M_1$.

The above embodiment provides an efficient, fully-functional neuron which can accommodate both excitatory and inhibitory neuron input signals. The use of two PCM cells in the differential configuration described allows both excitatory and inhibitory updates of the membrane potential, represented by the difference between the measurement signals, using the crystal growth dynamics of the cells in an efficient manner. The neuron implementation allows connectivity and operation in a neural network configuration, with a highly compact circuit realization. The apparatus employs a hybrid of analog components (PCM cell, access devices, current source, switch, current mirror, trigger-adjustable inverter) and digital components (latch, logic gate), all of which elements are typically of very small size. The circuitry thus offers a highly efficient neuron apparatus for seamless high-density integration in multi-neuron networks, e.g. via highly-dense synaptic arrays. The control signals for controlling circuit configuration are simple periodic signals. These can be applied globally in a multi-neuron system for synchronization of neuron operations, and can be readily generated from a system clock.

Figure 6:
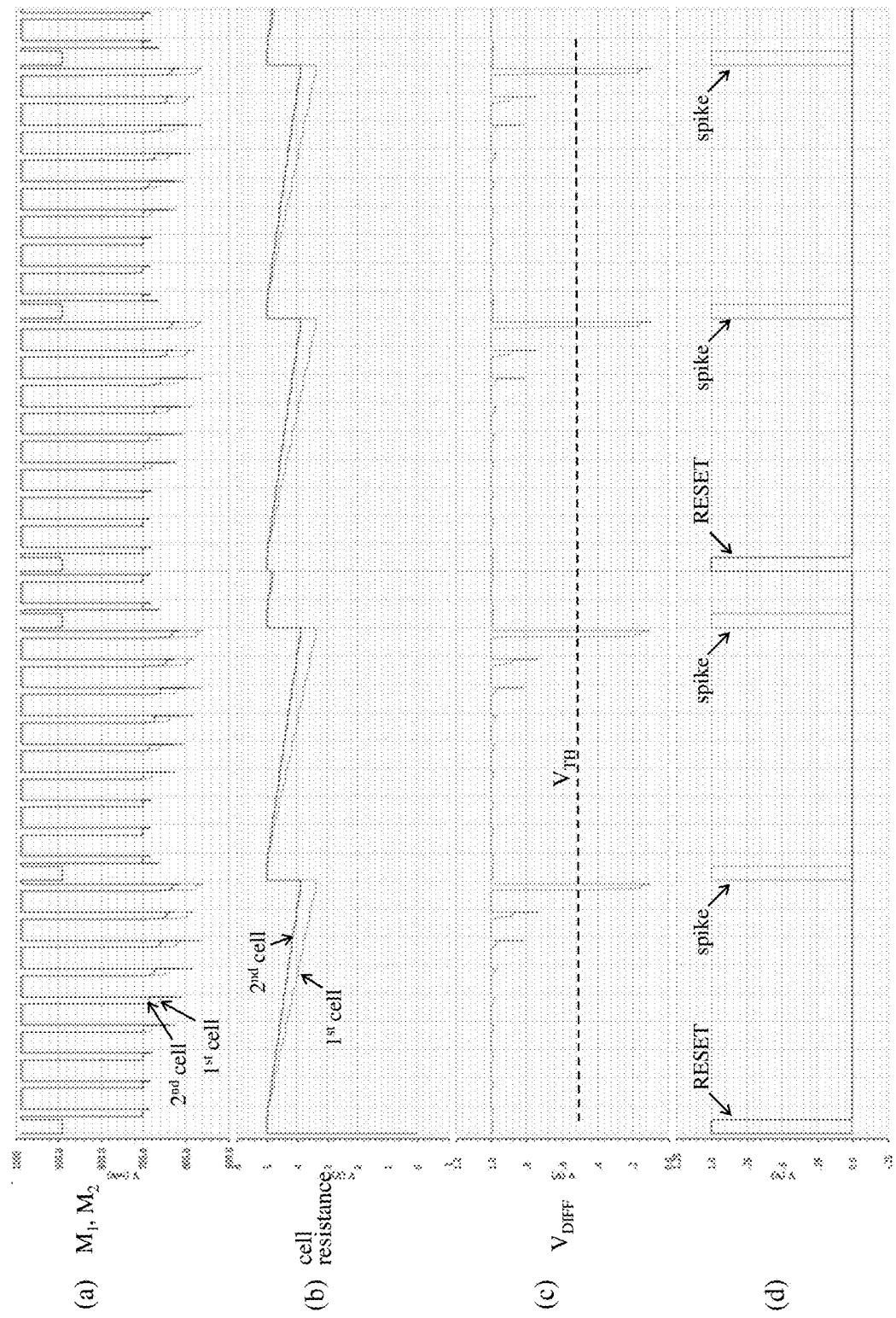
FIGS. 6 and 7 show simulation results for operation of the exemplary neuron apparatus, according to an embodiment of the invention.
Figure 7:
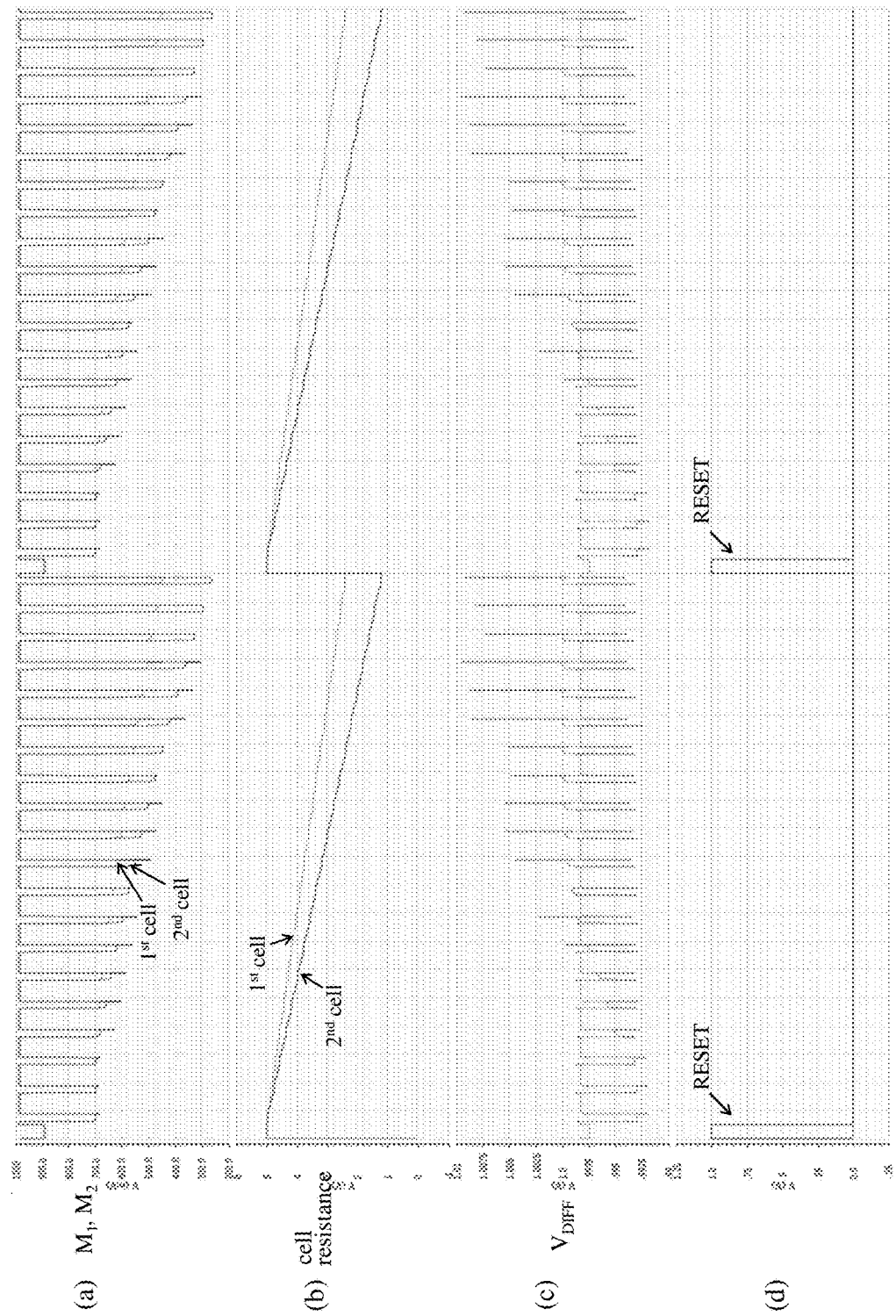

Effective operation of the neuron apparatus is demonstrated by the simulation results of FIGS. 6 and 7. FIG. 6 shows results of a simulation in which twice as many excitatory as inhibitory neuron input signals were applied to the neuron. The traces in section (a) show the measurement signals $M_1$ and $M_2$. Section (b) plots resistance of the first and second PCM cells. Section (c) shows the difference signal $V_{DIFF}$ in relation to the threshold voltage $V_{TH}$. Section (d) shows the output spikes and the periodic neuron reset signal. As illustrated, a spike is generated each time $V_{DIFF}$ drops below $V_{TH}$. The neuron is reset in response to each spike and each RESET pulse. FIG. 7 shows the corresponding operation where twice as many inhibitory as excitatory neuron input signals were applied. The magnified scale for $V_{DIFF}$ here shows variations in $V_{DIFF}$ due to inherent capacitances of transistors. However, $V_{DIFF}$ remains above the threshold $V_{TH}$ which is off the bottom of the scale here. No spikes are generated in section (d), and the neuron is periodically reset by the RESET signal.

Figure 8A:
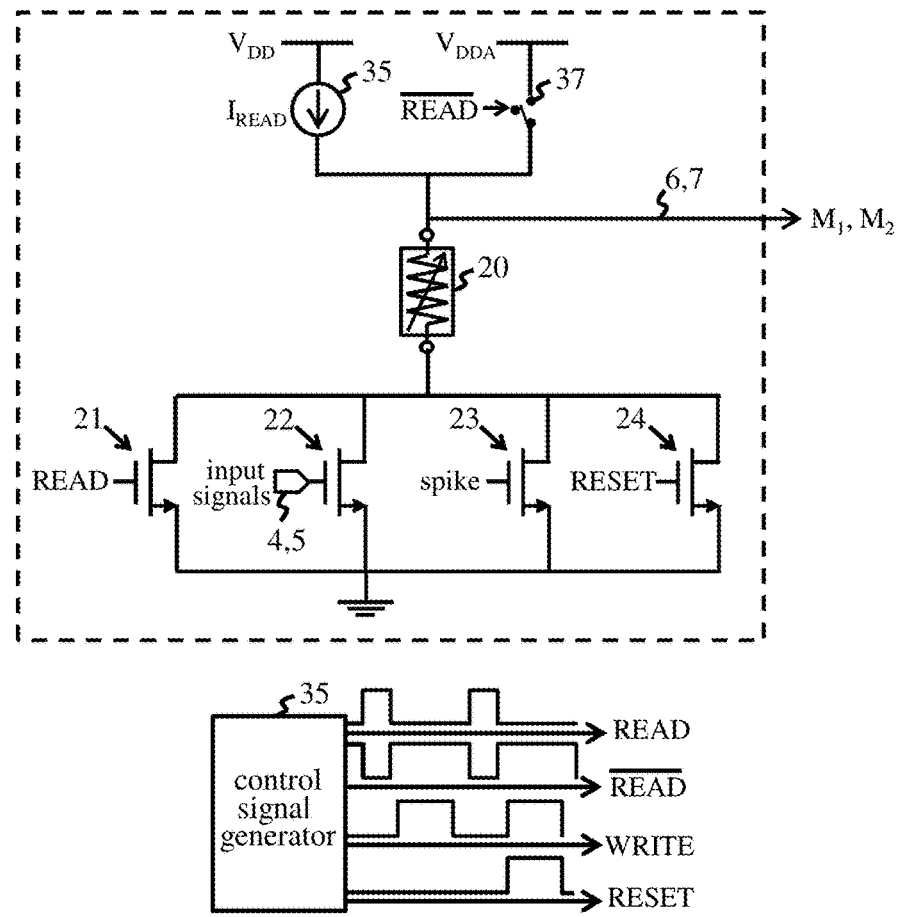
FIGS. 8a and 8b show alternative implementations for the PCM circuitry and output circuit, respectively, of the exemplary neuron apparatus, according to embodiments of the invention.
Figure 8B:
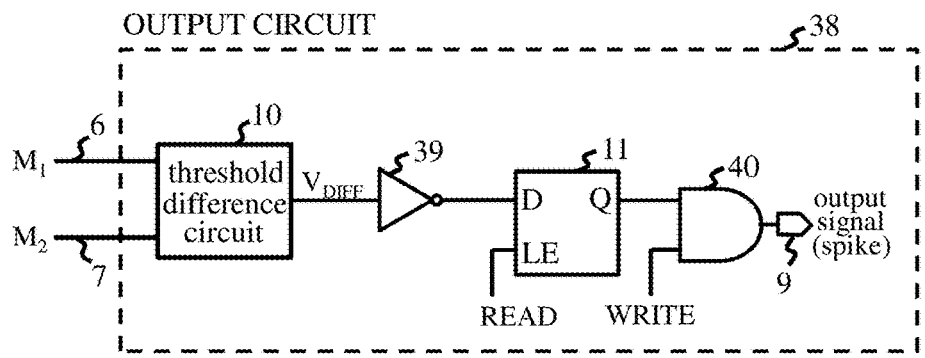

A second embodiment of the neuron apparatus is illustrated in FIGS. 8a and 8b. FIG. 8a shows structure of the PCM circuits of this embodiment, and FIG. 8b shows the output circuit. The circuitry corresponds broadly to that of the first embodiment above. Like elements are indicated by like reference numerals, and only key differences will be described. The control signal generator 35 of this embodiment generates control signals READ, $\overline{READ}$ and WRITE as shown in FIG. 8a. The signal $\overline{READ}$ is the inverse of the read signal READ. The read phase of neuron operation occurs when READ is high and hence $\overline{READ}$ is low. The write phase corresponds to the period for which the WRITE signal is high. This occurs during the period when READ is low, whereby alternating read and write phases are defined as before. In the PCM circuitry of FIG. 8a, the current source and switch are indicated schematically at 36 and 37 respectively. In this embodiment, switch 37 is operable in response to the control signal $\overline{READ}$. In particular, switch 37 closes when $\overline{READ}$ is high, applying a programming current to cell 20 during the write phase if access device 22 is enabled.

The output circuit 38 of FIG. 8b includes an inverter 39 connected between the threshold difference circuit 10 and the latch 11. The logic level at latch output Q is thus inverted compared to the previous embodiment. The logic gate connected to latch output Q is an AND gate 40 here. This AND gate is responsive to the write control signal WRITE, and thus provides a spike at output 9 during the write phase (WRITE=high) if latch output Q is also high. This occurs when $V_{DIFF}$ switches to logic 0 as before, i.e. when $M_2-M_1$ exceeds the firing threshold. Cell reset occurs in response to the spike and reset signals as before.

The neuron inputs 4, 5 may receive excitatory and inhibitory input signals concurrently in the above embodiments. Alternative embodiments may include an input signal generator as illustrated schematically in FIG. 9. The input signal generator 45 receives excitatory and inhibitory signals from other neurons/synapses in a network, and periodically supplies either an excitatory neuron input signal to input 4 of the first PCM circuit, or an inhibitory neuron input signal to input 5 of the second PCM circuit. An excitatory neuron input signal is generated if greater excitatory than inhibitory signals (e.g. greater in terms of overall number/amplitude/duration/power depending on operational details) are received from the network, and an inhibitory neuron input signal is generated if greater inhibitory than excitatory signals are received from the network. In this example, the input signal generator 45 includes a summation circuit 50. Signals from excitatory neurons/synapses are supplied to a positive input of this circuit, and signals from inhibitory neurons/synapses are supplied to a negative input. The summation circuit sums the received signals and periodically generates a signal $\Sigma$ whose amplitude depends on the resulting sum for the current period. The periodicity here corresponds to the read/write period of neuron operation, and the signal $\Sigma$ can be synced to the write phase. The sum signal $\Sigma$ is supplied to a threshold circuit 51. If the amplitude of sum signal $\Sigma$ is positive, a signal is supplied to input 4 of first PCM circuit 2. If the amplitude of sum signal $\Sigma$ is negative, a signal is supplied to input 5 of second PCM circuit 2. Use of such an input signal generator reduces the number of neuron programming operations, and hence reduces wear on the PCM cells 20. This offers reduced power consumption and improved cell endurance.

Numerous changes and modifications may of course be made to the exemplary embodiments described above. For example, neurons embodying the invention may use PCM cells other than the mushroom-cell type, as well as other resistive memory cells. Some examples include resistive RAM (RRAM) cells such as conductive bridge RRAM cells, oxide or metal-oxide RRAM cells, and carbon RRAM cells. While the examples above use circuits in which cell-resistance is progressively reduced by successive neuron input signals, other embodiments may be based on operation in which cell resistance progressively increases from an initial low-resistance state to a high-resistance state. Any resistive memory cell, which may include bipolar devices, in which resistance can be progressively increased may be used in such embodiments, one example being CBRAM (conductive bridge RAM) cells. Suitable circuit modifications to accommodate such cell operation will be readily apparent to those skilled in the art.

Embodiments might also be envisaged where it is desired to produce a spike when sufficiently more inhibitory than excitatory signals are received. The threshold difference circuit may then be adapted to produce spike if the difference $M_1-M_2$ exceeds a threshold. In alternative embodiments where cell resistance increases, the difference condition for firing can also be adapted appropriately. Similarly, embodiments might be envisaged where the measurement signals vary indirectly (inversely) with resistance of the first and second memory cells. Again, the difference condition for firing can be set appropriately to produce an output spike in desired circumstances.

Control signals need not be rectangular pulse trains. Control pulses may, for instance, have shaped leading and/or trailing edges if desirable for cell operation. Also, separate read and write control signals are used to define the read and write phases in the embodiments above. This allows read and write phases to be temporally separated, with a time interval between them. Separating the phases in this way may be advantageous depending on cell operating characteristics, particularly for high-speed operation. However, alternating read and write phases could be defined by different levels of a single control signal in other embodiments.

As a further example, while the above embodiments use access device 23 to provide an efficient cell reset mechanism on firing, other reset mechanisms can be envisaged, e.g. via a global reset signal which is selectively applied to the cell in response to a spike event. The PCM circuits in some embodiments may use an access device which is responsive to more than one signal for enabling current flow, e.g. one FET functioning as more than one of FETS 21 to 24 above. PCM circuits may also be designed to operate with a single voltage supply line if desired. Circuit configuration may be controlled in various other ways via different control signals, and other logic arrangements (e.g. using different logic gates and/or latch input/output arrangements) are also possible. Output circuits in which the latch is connected directly to the neuron output may be envisaged, or the latch may be omitted if syncing of spikes to the write phase is not required. The threshold difference circuit can also be implemented in various other ways, e.g. using sense-amplifier latches, as will be apparent to those skilled in the art. In general, where a component is described herein as connected to another component, such components may be connected directly or indirectly, e.g. via intervening components, unless otherwise indicated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An artificial neuron apparatus, comprising:
   a first resistive memory cell connected in first circuitry having a first neuron input, for receiving excitatory neuron input signals, and a first output;
   a second resistive memory cell connected in second circuitry having a second neuron input, for receiving inhibitory neuron input signals, and a second output;
   said first and second circuitry being operable in alternating read and write phases to apply a programming current, for programming cell resistance, to their respective memory cells on receipt of an excitatory and an inhibitory neuron input signal respectively during said write phase, whereby resistance of the respective cells is progressively changed in response to successive excitatory and inhibitory neuron input signals respectively, and, during said read phase, to apply a read current to their respective cells to produce first and second measurement signals respectively, dependent on resistance of the respective cells, at the first and second outputs respectively; and an output circuit connected to said first and second outputs and configured to produce a neuron output signal at a neuron output if a difference between said first and second measurement signals traverses a threshold;

wherein the output circuit comprises a threshold difference circuit connected to said first and second outputs and operable to output a difference signal dependent on said difference, wherein the difference signal corresponds to a first digital value if said difference traverses said threshold, and a second digital value otherwise;

wherein the threshold difference circuit comprises a current mirror and a trigger-adjustable inverter, the current mirror being connected to said first and second outputs and operable to provide a difference output, dependent on said difference, to the trigger-adjustable inverter, and the trigger-adjustable inverter being operable in response to said difference output to produce the difference signal corresponding to one of said first and second digital values;

wherein the output circuit comprises:

a digital latch operable in said read phase to latch a digital value dependent on said difference signal; and a logic gate connected between the latch and said neuron output and operable in said write phase, in response to the latched digital value, to provide said neuron output signal at the neuron output if said difference traverses said threshold.

2. The apparatus as claimed in claim 1, wherein each of the first and second circuitry is selectively configurable for operation in said read and write phases in response to a set of control signals defining the read and write phases.

3. The apparatus as claimed in claim 2, wherein the first and second circuitry are further configurable in response to said neuron output signal to apply a reset current to their respective memory cells for resetting the cells to an initial resistance state.

4. The apparatus as claimed in claim 3, wherein the first and second circuitry are further configurable in response to a neuron reset signal, received during said write phase, to apply a reset current to their respective memory cells for resetting the cells to said initial resistance state.

5. The apparatus as claimed in claim 4, wherein:

each of the first and second circuitry comprises a current source for supplying said read current to the respective memory cell during said read phase; and the first circuitry comprises a plurality of access devices connected between a first terminal of the first memory cell and a reference terminal of the circuitry, respective access devices enabling current flow through the first cell in response to said read phase, said excitatory neuron input signals, said neuron output signal, and said neuron reset signal; and the second circuitry comprises a plurality of access devices connected between a first terminal of the second memory cell and a reference terminal of the circuitry, respective access devices enabling current flow through the second cell in response to said read phase, said inhibitory neuron input signals, said neuron output signal, and said neuron reset signal.

6. The apparatus as claimed in claim 2, wherein:

each of the first and second circuitry comprises a current source for supplying said read current to the respective memory cell during said read phase; and the first circuitry comprises at least one access device, connected between a first terminal of the first memory cell and a reference terminal of the circuitry, for enabling current flow through the first cell in response to said read phase and said excitatory neuron input signals; and the second circuitry comprises at least one access device, connected between a first terminal of the second memory cell and a reference terminal of the circuitry, for enabling current flow through the second cell in response to said read phase and said inhibitory neuron input signals.

7. The apparatus as claimed in claim 6, wherein:

said current source in each of said first and second circuitry is connected to a second terminal of the respective memory cell;

each of the first and second circuitry includes a switch connected to said second terminal, the switch being configured to apply said programming current to the cell during said write phase; and each of the first and second outputs is connected to said second terminal of the respective memory cell.

8. The apparatus as claimed in claim 7, wherein the digital latch is configured to latch said digital value output by the threshold difference circuit, and said logic gate comprises a NOR gate.

9. The apparatus as claimed in claim 7, wherein the output circuit comprises an inverter connected between the threshold difference circuit and the digital latch, and wherein said logic gate comprises an AND gate.

* * * * *